United States Patent [19]

Tannous et al.

[11] Patent Number: 5,026,531

[45] Date of Patent: Jun. 25, 1991

[54] SILICATE TREATMENT OF MOLECULAR SIEVE AGGLOMERATES

[75] Inventors: Medhat K. Tannous, Mobile, Ala.; John D. Sherman, Chappaqua, N.Y.; Alan P. Cohen, New Fairfield, Conn.

[73] Assignee: UOP, Des Plains, Ill.

[21] Appl. No.: 310,121

[22] Filed: Feb. 10, 1989

[51] Int. Cl.$^5$ ............................................. C10B 79/00
[52] U.S. Cl. ..................................... 423/328; 502/69; 23/313 AS
[58] Field of Search ............. 502/69; 423/118, 328 C; 23/313 AS

[56] References Cited

U.S. PATENT DOCUMENTS

| | | | |
|---|---|---|---|
| 3,114,603 | 12/1963 | Howell | 423/118 |
| 3,119,660 | 1/1964 | Howell et al. | 423/118 |
| 3,536,521 | 10/1970 | McKinney et al. | 117/98 |
| 3,624,003 | 11/1971 | Conde | 252/455 Z |
| 3,625,866 | 12/1971 | Conde | 252/455 Z |
| 4,405,503 | 9/1983 | Barclay et al. | 252/455 Z |
| 4,452,909 | 6/1984 | Yang | 502/69 |
| 4,818,508 | 4/1989 | Flank et al. | 423/328 L |

FOREIGN PATENT DOCUMENTS 972833 10/1964 United Kingdom .

Primary Examiner—Gary P. Straub
Assistant Examiner—Stuart L. Hendrickson
Attorney, Agent, or Firm—Thomas K. McBride; John G. Tolomei

[57] ABSTRACT

Molecular sieve agglomerates that can have improved physical and chemical properties are prepared by methods which comprise contacting the agglomerates with an alkali metal silicate solution. Molecular sieve agglomerates which comprise binders such as kaolin can additionally be contacted with an alkali hydroxide solution to convert the kaolin to Zeolite A prior to contacting the agglomerates with the alkali metal silicate solution to further improve properties. The molecular sieve agglomerates prepared according to the present invention are suitable for use as refrigerant desiccants.

9 Claims, No Drawings

SILICATE TREATMENT OF MOLECULAR SIEVE AGGLOMERATES

FIELD OF THE INVENTION

The present invention relates to molecular sieve agglomerates and more particularly to methods for treating molecular sieve agglomerates that can provide improved physical and chemical properties.

BACKGROUND OF THE INVENTION

Crystalline molecular sieves occur naturally or are synthesized as fine crystalline bodies which for general utility in commercial adsorptive or catalytic processes are usually formed into agglomerates, preferably possessing as high a degree of attrition resistance and crush strength as possible without unduly affecting the adsorptive properties of the sieves. One method of agglomerating these finely crystalline materials is by combining them with a clay binder as described in U.S. Pat. No. 2,973,327, issued Feb. 28, 1961 in the name of W. J. Mitchell, et al. Whereas this prior technique provides a suitable agglomerate for a wide variety of industrial applications, it has been found that certain applications having a very low tolerance for attrition-produced particles or dust require a more strongly bound molecular sieve agglomerate.

Moreover, in certain other processes, e.g. refrigerant drying, environments exist which are chemically incompatible with some molecular sieve agglomerates. Refrigerants often contain halogenated hydrocarbons which can decompose and the decomposition products, e.g., hydrogen fluoride and hydrogen chloride, can react with both the internal active sites in the molecular sieve as well as the binder.

As a result of the above-described problems, processes have been developed to improve both the physical properties, i.e., crush strength and attrition resistance, and chemical properties, i.e., compatibility with halogenated refrigerants, of molecular sieve agglomerates.

U.S. Pat. No. 3,536,521 discloses a silicone coated molecular sieve and method for preparing same wherein a silicone coating is applied to the surface of a molecular sieve by dissolving a silicone oil in an appropriate solvent, adding the sieves to the resulting solution and evaporating the solvent, leaving a uniform silicone deposit on the sieve surface. The sieve is then thermally activated for use as a drying agent. The above-identified patent discloses that certain gases, e.g., refrigerants, are not adsorbed on the coated surface. However, no disclosure is provided relating to attrition and other physical breakage problems, nor to subsequent chemical attack of the new surfaces after such breakage has occurred.

Other methods have been proposed to incorporate silicon on the surfaces throughout the molecular sieve agglomerates to provide improved physical strength as well as chemical resistance. These methods commonly involve incorporating a silicate treatment step, i.e., contacting with an aqueous alkali metal silicate solution, into the molecular sieve agglomerate manufacturing procedure.

For example, U.S. Pat. No. 3,624,003 discloses molecular sieve agglomerates and methods for preparing same wherein improved, attrition resistant desiccant bodies are prepared by the process which comprises applying to the outer surface of a crystalline zeolitic molecular sieve agglomerate an essentially continuous coating of a finely divided inert alpha-alumina monohydrate which has been thermally treated at temperatures of from about 250° C. to 350° C. to reduce the surface activity thereof, contacting and impregnating at least the coating of the agglomerate thus formed with an aqueous solution of potassium silicate, drying the potassium silicate impregnated agglomerate to remove a substantial portion of water therein, and thereafter firing the resulting composite agglomerate to set and harden the silicate and activate the molecular sieve. This firing, or heating step, is sometimes referred to as calcination.

Similarly, U.S. Pat. No. 3,625,886 discloses molecular sieve agglomerates and methods for preparing same, however this patent discloses the use of a mixture of disapore, i.e., beta-alumina monohydrate, and a clay mineral, instead of the alpha-alumina monohydrate disclosed in U.S. Pat. No. 3,624,003.

Both of the above-identified patents disclose that the silicate treatment step is performed on the agglomerates prior to the heating step which sets, or hardens, the binder. That is, the silicate treatment is an integral step in the molecular sieve agglomerate manufacturing procedure.

Other patents also disclose this process sequence. British Patent Specification 972,833 discloses a method for hardening a crystalline zeolite molecular sieve agglomerate formed of such zeolite molecular sieve and a clay mineral binder, which comprises contacting the agglomerate in a hydrated state with an aqueous solution of an alkali metal silicate having a solid content of from 3% to 35% by weight to impregnate the agglomerate with the alkali metal silicate, separating the impregnated agglomerate from the solution and firing such impregnated agglomerate at a temperature of at least 343° C. and below the temperature at which the crystalline zeolitic molecular sieve loses its structural ability.

Also, U.S. Pat. No. 4,405,503 discloses a method for strengthening zeolitic molecular sieve agglomerates, particularly of the bound variety, which enables them to retain (a) their strength to a satisfactory extent despite subsequent acid treatment and (b) their suitability for use as a catalyst support. The method comprises treating the agglomerate with an aqueous solution of water soluble silicon compound and subsequently with an aqueous solution of a mineral acid of sufficient strength to decationize the zeolitic molecular sieve and/or increase its $SiO_2:Al_2O_3$ ratio. The decationized zeolitic molecular sieve is thereafter calcined.

Although the above-described methods for treating molecular sieve agglomerates have been useful, new methods are sought which could be performed subsequently to the binder setting step, e.g., calcination step. Such a method could be utilized in existing manufacturing facilities where intermediate method steps may not be conveniently implemented. Moreover, such a processing sequence could result in a high degree of product consistency, i.e, little variation in physical and chemical properties.

SUMMARY OF THE INVENTION

Methods are provided for treating molecular sieve agglomerates in order to provide an improvement in at least one physical or chemical property, preferably improved attrition resistance, crush strength, water adsorption capacity and compatibility with halogenated refrigerants, which comprises contacting an initial agglomerate comprising molecular sieve and binder which had been previously heated to set the binder with an aqueous alkali metal silicate solution, and thereafter drying the agglomerate to remove water therefrom.

In one preferred aspect, the method comprises contacting the initial agglomerate which contains zeolite, preferably the sodium exchanged or potassium-exchanged forms of Zeolite A, and a clay binder, preferably kaolin, attapulgite and mixtures thereof, with a potassium silicate solution to form a treated agglomerate, and thereafter drying the treated agglomerate by heating in air to a temperature of from about 200° C. to 650° C.

In another preferred aspect, the method further comprise$ contacting the initial agglomerate which contains zeolite and a kaolin clay binder, prior to the alkali metal silicate solution contacting, with an alkali hydroxide solution, preferably a sodium hydroxide solution comprising from about 5 to about 50 weight percent, more preferably from about 5 to about 10 weight percent sodium hydroxide at conditions effective to convert the kaolin to Zeolite A and form a converted agglomerate, said contacting preferably performed at a temperature of from about 40° C. to 110° C. and more preferably from about 90° C. to 95° C., and thereafter contacting the converted agglomerate with a sufficient quantity of water to have a pH of between about 9 to 12, and more preferably about 10.

DESCRIPTION OF THE INVENTION

The present invention provides molecular sieve agglomerates that can have improved physical and chemical properties and methods for preparing the agglomerates. Preferably, the improved properties obtained in accordance with the present invention are at least one of improved attrition resistance, improved crush strength, improved water adsorption capacity and improved chemical resistance to halogenated refrigerants.

The molecular sieves suitable for use according to the present invention include the various forms of silicoaluminophosphates, and aluminophosphates disclosed in U.S. Pat. Nos. 4,440,871, 4,310,440, and 4,567,027, hereby incorporated by reference, as well as zeolitic molecular sieves, which are preferred.

Zeolitic molecular sieves in the calcined form may be represented by the general formula:

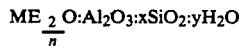

$$\frac{ME_2}{n}O:Al_2O_3:xSiO_2:yH_2O$$

where Me is a cation, x has a value from about 2 to infinity and y has a value of from about 2 to 10.

Typical well known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Detailed descriptions of the above-identified zeolites, as well as others, may be found in D.W. Breck, *Zeolite Molecular Sieves*, John Wiley and Sons, New York, 1974, hereby incorporated by reference. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicalite disclosed in U.S. Pat. No. 4,073,865, hereby incorporated by reference.

It is especially preferred that for use in drying halogenated refrigerants the agglomerates of the present invention contain as the zeolitic molecular sieve the species known as Zeolite 3A, which has uniform pore diameter of about 3 Anstroms, Zeolite 4A, which has uniform pore diameters of about 4 Angstroms, and mixtures thereof. Zeolite 3A can be prepared from the sodium cation form of Zeolite A, i.e., Zeolite 4A, by replacing at least 65 equivalent percent of the sodium cations with potassium cations by conventional cation exchange techniques. Both Zeolite 3A and Zeolite 4A, as well as methods for their preparation are disclosed by D.W. Breck, supra, and are available from UOP, Des Plaines, Illinois.

For purposes of the present invention it is desired that the solid adsorbent be agglomerated with a binder in order to ensure that the molecular sieve will have suitable physical properties. Although there are a variety of synthetic and naturally occurring binder materials available such as metal oxides, clays, silicas, aluminas, silica-aluminas, silica-zirconias, silica-thorisas, silica-berylias, silica-titanias, silica-alumina-thorias, silica-alumina-zirconias, mixtures of these and the like, clay type binders are preferred. Examples of clays which may be employed to agglomerate the zeolites without substantially altering the adsorptive properties of the zeolite are attapulgite, kaolin, volclay, sepiolite, halloysite, palygorskite, ball clays, bentonite, montmorillonite, illite and chlorite. Kaolin and attapulgite binders are particularly preferred for practicing the present invention and may be obtained from UOP, Des Plaines, IL. Fibrous additives such as kaowool or glass fibers may also be optionally used with the binder.

When clay binders are utilized, the amount of clay with respect to molecular sieve in the preferred starting agglomerate depends primarily upon the degree of dilution of the molecular sieve permissible in a desired use of the final product. For most purposes, a clay content of from 5 percent to 40 percent by weight of the final product is satisfactory. Preferably, the clay content will be from about 10 percent to about 25 percent by weight of the molecular sieve agglomerate.

After the molecular sieve is mixed with the binder in the desired proportions, the mixture is then formed into an agglomerate, typically by extrusion or bead formation. These formed agglomerates are commonly referred to as "green" agglomerates. Next, the green agglomerates are typically heated to a temperature sufficient to set the binder and cause hardening thereof thereby forming the initial agglomerates of the present invention. This heating step is sometimes referred to as calcination. The temperature required to set the binder depends on what binder is used. For example, a temperature of about 200° C. is required to set most silica binders. On the other hand, a temperature of from about 500° C. to about 700° C. is required to set most clay binders. When kaolin clays are used, it is preferred that the binder be set at a temperature of from about 550° C. to 650° C. The details of the above-described techniques in forming molecular sieve agglomerates are well known to those skilled in molecular sieve technology.

Unlike methods previously proposed for treating molecular sieve agglomerates with silicate solutions, the method of the present invention does not require that the silicate treatment be performed prior to the heating step which sets, or hardens, the binder in the agglomerate. In fact, in accordance with the present invention, the silicate treatment is advantageously performed subsequently to the setting of the binder. As a result, it is possible to practice the present invention using existing, i.e., hardened, molecular sieve agglomerates. Accordingly, the method of the present invention can be utilized in existing manufacturing facilities where intermediate method steps may not be conveniently implemented. Moreover, such a processing sequence can result in a high degree of product consistency, i.e, little variation in physical and chemical properties.

In accordance with the present invention, the initial agglomerate which has been previously subjected to heating at an elevated temperature sufficient to set the binder is thereafter contacted or soaked in an aqueous alkali metal silicate solution, such as sodium silicate or potassium silicate, to form a treated agglomerate. Potassium silicate is preferred, particularly when Zeolite 4A is treated, because in addition to providing improved physical properties, e.g. crush strength and attrition resistance, the potassium cations in the potassium silicate solution can ion-exchange with the sodium cations in the Zeolite 4A, thereby reducing the pore size to 3 Angstroms and improving the chemical resistance to halogenated refrigerants which are not as easily adsorbed into the 3 Angstrom pores. It is, of course, possible to introduce the silicon compounds as colloidal silica in suspension in the impregnating solution, however this may not materially improve the product, nor will it facilitate ion-exchange if such ion-exchange is desired.

The solid content cf the silicate solution which is the sum of weight percent of the alkali metal oxide and the silicon dioxide in the solution may be from about 2 to about 30 weight percent. Lower than about 2 percent will not provide a sufficient introduction of silicate into the agglomerate to materially improve the crush strength, while more than about 30 percent can lead to a loss of adsorption capacity of the contained molecular sieve. The alkali metal oxide may be present in the range to provide about 0.40 to about 0.60 pounds alkali metal oxide per pound of silicon dioxide. Ratios lower than about 0.40 may be used but are not preferred because they tend to have increasing amounts of the silicone dioxide present in undissolved form. Typically, alkali metal silicate solutions may contain from about 1 to about 10 weight percent alkali metal oxide and from about 2 to about 20 weight percent silicon dioxide.

Within the above ranges of ratio of oxides and solid contents of the solution, the quantity of solution employed to impregnate a quantity of coated molecular sieve agglomerate may be in the range to provide from about 0.10 to about 0.50 pounds of solution solid per pound of agglomerate.

The contacting or soaking of the agglomerates in the silicate solution may be either batch-type or continuous. When batchwise contacting is employed, it is desirable to provide agitation for uniformity. Such agitation may be conducted by stirring the solution with moderation, to avoid breaking up the agglomerates.

Continuous contacting is conveniently accomplished by percolating the solution through a chamber containing the agglomerates. In the continuous-contact method the concentration of the solids in the silicate solution may be in the lower concentration range and the solution can be replenished as the solids are depleted.

The immersion may be hot or cold, the advantage of heat being that shorter contacting time may be employed but the disadvantage is the increased tendency toward alkali attack on the crystal structure of the zeolitic molecular sieve. Temperatures below about 60° C., preferably below about 40° C., are desired to reduce this attack, particularly when the alkali metal oxide to silicon dioxide ratio is high.

The amount of silicate impregnated into the agglomerates is affected by all of the variables in the instant method and the time of contacting. In some instances when using concentrated treating solutions, elevated temperatures, and very porous agglomerates, an immersion time of a few minutes is satisfactory. Longer contacting times will generally result in an increase in the quantity of silicate entering the agglomerate and the distance of penetration of the silicate into the agglomerate. The time may extend to several hours or even several days, if desired, provided that the integrity of the agglomerate or the molecular sieve crystal is not affected. Increase in either or both the concentration and distance of the penetration will increase the final crush strength of the product.

It is readily seen that by employing short immersion times in the practice of this invention, one can make a product having a hardened, abrasion-resistant exterior on the agglomerates which is entirely satisfactory for applications where this property is desired. On the other hand, longer contact times will effect a somewhat deeper hardening, which is preferred for maximum crush strength.

Following the immersion step, the agglomerates are separated from the treating solution and may, if desired, be given a brief water rinse which will remove just enough of the solution adhering to the outer surface of the agglomerates to eliminate the tendency of the agglomerates to adhere to each other.

After the agglomerates have been separated from the silicate solution, they are to be dried in order to remove water therefrom. Such drying can be accomplished in a number of ways, for example, the agglomerates can be allowed to dry in air or purged with suitable drying gas such as nitrogen. Preferably, the agglomerates are heated at an elevated temperature, preferably between about 200° C. and 650° C. and most preferably between about 500° C. to 650° C. The final drying temperature is determined by the desired water content remaining on the molecular sieve agglomerate, i.e., higher drying temperatures result in lower water content.

Another aspect of the present invention provides molecular sieve agglomerates that can have even further improved physical and chemical properties and methods for their production. This aspect relates specifically to the conversion of a binder, preferably kaolin, to a zeolite and comprises an additional processing step wherein the initial agglomerate is contacted with an alkali hydroxide solution at conditions effective to convert the binder to Zeolite A, thereby forming a converted binder. Although kaolin is a preferred binder for this purpose, other binders having a silica to alumina ratio similar to zeolite, i.e., from about 1 to about 4, may also be suitable. Such binders would include, for example, halloysite and montmorillonite. The converted binder is thereafter contacted with the alkali metal silicate solution as hereinbefore described.

The alkali hydroxide solution preferably comprises from about 5 to about 50 percent, and more preferably about 5 to about 10 percent by weight of sodium hydroxide. Sodium hydroxide is preferred because the sodium ions are effective to convert the binder to Zeolite 4A. However, it can be appreciated that potassium hydroxide may be used when it is desired to produce Zeolite 3A. The contacting of said initial agglomerate with the alkali hydroxide solution is preferably performed at a temperature of from about 40° C. to about 110° C. and more preferably at a temperature of from about 90° C. to about 95° C. and for a time sufficient to substantially convert the binder to Zeolite A. It can be appreciated that the time required to convert the binder is variable and dependent on such factors as the concentration of the alkali hydroxide solution and the amount of binder in the initial agglomerate. Although the appropriate contacting time can be determined by testing the agglomerate at various times during the contacting, in general contacting times of from about 1 to about 6 hours are sufficient. D. W. Breck, supra, at pages 731 to 734, describes the kaolin clay conversion process to Zeolite A, i.e., the dehydroxylation of kaolin to metakaolin which occurs upon heating the binder, followed by the conversion of metakaolin to Zeolite A by treatment with alkali hydroxide.

After the binder has been converted to Zeolite A, it is desirable to contact the converted agglomerate with a sufficient quantity of water to remove excess alkali hydroxide solution prior to said contacting with the alkali metal silicate solution. This contacting is preferably continued until the pH of the converted agglomerate is between about 9 to about 12, and more preferably to a pH of about 10.

In assessing the exceptional physical properties of the agglomerates of this invention, a number of test procedures were employed. Both activated agglomerate beads, i.e., purged with nitrogen at 350° C. for about 10 hours, and hydrated beads, i.e., 15 to 20 weight percent water, were used for some of the tests. They are as follows:

1. Paint Shaker Attrition Test.

This test measures principally attrition strength. In accordance with the procedure, 136 ml of desiccant beads are placed in a cylindrical 150 ml container having a diameter of 4.4 cm. and a height of 10 cm. 68 ml. of trichloroethylene are added, the container closed, and subjected to a high frequency swirling motion in a model No. 30 Red Devil Paint Conditioner (manufactured by Red Devil Tools, Union, NJ) for 120 minutes. The fines produced by attrition are thereafter washed from the beads with additional trichloroethylene through a No. 100 U.S. Standard Sieve into a beaker, isolated from the trichloroethylene, heated to 350° C. to activate the sieve, and weighed. The weight obtained, expressed as a weight percent of the initial charge of desiccant beads is taken as the measure of the paint shaker attrition strength.

2. Crush Strength Test

This test consists of placing a single agglomerate on an anvil on a load measuring device and increasing the loading force on a plate arranged to rest on top of the agglomerate until it is crushed. The crush strength value (pounds) is an average for at least 15 activated agglomerates.

3. Refrigerant compatibility.

This test is designed to determine the tendency of a molecular sieve desiccant to chemically decompose halogenated refrigerants to decomposition products such as hydrogen fluoride and hydrogen chloride. The procedure is as follows:

Approximately 125 g of beads, previously activated at about 350° C. for at least about 10 hours under vacuum, are loaded into a 300 cc. stainless steel bomb with approximately 80 g of refrigerant, e.g., R-22 (chlorodifluoromethane) or R-134a (1,1,1,2-tetrafluoroethane) and approximately 8 g of a suitable refrigerant oil. Suniso 3GS, a naphthenic oil, available from Witco Corporation, New York, N.Y., is suitable for use with R-22, and LB525, a polyalkelene glycol, available from Union Carbide Corporation, Danbury, CT, is suitable for R-134a. The bomb is then sealed and maintained at about 180° F. for 14 days. The beads are thereafter removed from the bomb and purged with nitrogen at about 300° C. for about 2 hours. Next, the beads are analyzed for fluoride content by any suitable means, such as by pyrohydrolysis and measurement by ion-selective electrode. The results are reported as weight percent fluoride. Low fluoride values are indicative of a greater degree of compatibility.

4. $H_2O$ Adsorption Capacity.

This test is performed using a standard McBain gravimetric apparatus. The beads are initially purged with nitrogen at about 300° C. for about 2 hours prior to loading into the apparatus. A quantity of beads, e.g., about 1 to 5 g, is loaded into the McBain apparatus and heated to about 400° C. to 450° C. for about 2 hours under vacuum and thereafter cooled to room temperature. The beads are thereafter exposed to water vapor at a partial pressure of 4.6 torr at room temperature. The equilibrium water pick-up is expressed in weight percent $H_2O$.

The following examples are provided for illustrative purposes and are not intended to be limitations on the claims that follow.

EXAMPLE 1

Treatment of molecular sieve agglomerates: 150 pounds of 4A-XH5, 8×12 beaded adsorbent obtained from UOP, Des Plaines, IL., were initially hydrated with about 20 pounds of water. The hydrated beads were then soaked in approximately 350 pounds of a potassium silicate solution consisting of about 2.4 weight percent potassium oxide, 6.0 weight percent silicon dioxide, with the balance consisting of water, at room temperature for about six hours. The beads were thereafter removed from the solution, rinsed with about 2.5 gallons of water per pound of beads, and dried by heating in air to a temperature of about 650° C., maintaining said temperature for about 0.5 hours and thereafter cooling to room temperature.

EXAMPLE 2

Treatment of molecular sieve agglomerates with binder conversion: 450 g of 4A-XH5, 8×12 beaded adsorbent obtained from UOP, Des Plaines, Illinois were initially hydrated with about 60 g of water. The hydrated beads were then contacted in approximately 1890 g of a solution consisting of about 6 weight percent sodium hydroxide with the balance consisting of water for about 4 hours at about 93° C. with mild stirring. The beads were thereafter removed from the sodium hydroxide solution and washed with water until the beads had a pH of about 10. The washed beads were dried in ambient air overnight then processed in accordance with Example 1, beginning with the potassium silicate solution soaking.

EXAMPLE 3

Test results: The molecular sieve agglomerates treated in accordance with Examples 1 and 2 were tested in accordance with the procedures described in tests 1 to 4 set forth above. Untreated 4A-XH5 and 4A-XH6, 8×12 beaded adsorbents, obtained from UOP, Des Plaines, IL, were used as standards. The results of the tests are summarized in Table 1 below.

TABLE 1

|  | Example 1 Agglomerates | Example 2 Agglomerates | Untreated 4A-XH5 Agglomerates | Untreated 4A-XH6 Agglomerates |
| --- | --- | --- | --- | --- |
| Paint Shaker Attrition, wt % | | | | |
| Activated | 0.10 | — | 0.14 | 0.30 |
| Hydrated | 1.3 | 0.52 | 2.1 | 7.3 |
| Crush Strength, pounds | | | | |
| Activated | 26.0 | 12.9 | 14.5 | 14.4 |
| Hydrated | 13.9 | 7.6 | 5.6 | 3.8 |
| Refrigerant Compatibility with R-134a, wt % Fluoride | 0.02 | — | 1.7 | 0.02 |
| Water Adsorption Capacity, wt % at 4.6 torr, 25° C. | 18.4 | 23.0 | 20.4 | 18.0 |

We claim:

1. Method for preparing attrition resistant molecular sieve agglomerates, comprising:
    (a) forming an initial agglomerate comprising zeolite and binder selected from the group consisting of metal oxides, clays, silicas, aluminas, silica-aluminas, silica-zierconias, silica-thorisas, silica-berylias, silica-titanias, silica-alumina-thorias, silica-alumina-zirconias and mixtures thereof.
    (b) heating the initial agglomerate at a temperature within the range of from about 200–700° C. and sufficient to set the binder and form a calcined agglomerate;
    (c) contacting the calcined agglomerate with an aqueous alkali metal silicate solution containing from about 1 to 10 wt. % alkali metal oxide and from about 2 to 20 wt. % silicon dioxide to form a treated agglomerate; and
    (d) drying the treated agglomerate at a temperature of from about ambient temperature to about 650° C. and sufficient to remove water therefrom.

2. Method of claim 1 wherein said zeolite is the potassium-exchanged form of Zeolite A having uniform pore diameters of about 3 Angstroms.

3. Method of claim 1 wherein said zeolite is the sodium-exchanged from of Zeolite A having uniform pore diameters of about 4 Anstroms.

4. Method of claim 1 wherein the binder comprises from about 5 percent to about 40 percent by weight of said initial agglomerate.

5. Method of claim 1 wherein the binder is a clay binder selected from the group consisting of kaolin, attapulgite and mixtures thereof.

6. Method of claim 1 wherein the alkali metal oxide is potassium oxide.

7. Method of claim 1 wherein said drying is conducted by heating in air to a temperature of from about 200° C. to 650° C.

8. Method of claim 1 wherein the binder is kaolin clay.

9. Method of claim 8 wherein the temperature sufficient to set the binder in said initial agglomerate is from about 550° C. to about 650° C.

* * * * *